3,137,657
CERAMIC PRODUCT COMPRISING SINTERED
BERYLLIA AND BENTONITE AND METHOD
John F. Quirk, Cardiff, and Fred H. Loftus, Del Mar, Calif., assignors, by mesne assignments, to the United States of America as represented by the United States Atomic Energy Commission
No Drawing. Filed Apr. 11, 1962, Ser. No. 187,181
12 Claims. (Cl. 252—478)

The present invention generally relates to ceramic products and more particularly relates to ceramic products having increased resistance to radiation damage and to a method of preparing such products.

When certain ceramic materials are subjected to intense irradiation, as for example ceramic moderators in high temperature neutron reactors, they characteristically undergo some depreciation in their physical characteristics. In this connection, certain ceramic products characteristically expand when subjected to such intense radiation and their densities correspondingly decrease. There may be a concomitant decrease in structural strength of the ceramic products and also an increase in the gas permeability thereof.

It would be desirable to provide ceramic materials susceptible to such changes with increased resistance to radiation damage when subjected to high intensity radiation, such as normally encountered in neutron reactors and the like.

Such increase in resistance to radiation damage is now provided in accordance with the method of the present invention. Products fabricated of ceramic materials normally susceptible to radiation damage, when prepared in accordance with the present method, exhibit relatively litle radiation damage. Only small dimensional increases occur when irradiated in high neutron fluxes at elevated temperatures over extended periods of time. The density of such products decreases only slightly and decreases in structural strength are minimized, as are increases in gas permeability.

Accordingly, the principal object of the present invention is to provide ceramic products having improved resistance to radiation damage. It is also an object of the present invention to provide a method of preparing ceramic products having increased resistance to radiation damage. It is a further object of the present invention to provide ceramic products, suitable as neutron moderators, which products resist to an increased extent radiation damage effects when exposed to high intensity neutron radiation at elevated temperatures. It is a further object of the present invention to provide ceramic products which exhibit decreased dimensional, density, permeability, and structural strength changes, in contrast to products prepared from the same ceramics but by conventional procedures, during intense neutron irradiation at elevated temperatures.

Further objects and advantages of the present invention will be apparent from a study of the following detailed description.

The present invention generally comprises preparing a radiation resistant ceramic product by suitably combining particulate refractory oxide of a selected type with silicate glass-forming sintering agent. More particularly, the indicated constituents are suitably mixed together and subjected to a forming operation comprising cold pressing and sintering to produce a glassy phase between the refractory oxide particles in the product. This arrangement of constituents in the finished product provides the desired improved resistance to radiation damage and renders the product particularly advantageously utilizable as ceramic moderator for nuclear reactors and the like.

Now referring more particularly to the steps of the method of the present invention, refractory oxide in particulate form is combined with silicate glass-forming sintering agent. The refractory oxide is one which is subject to the described type of radiation damage. In this regard, beryllia is particularly susceptible to such damage. Accordingly, the refractory oxide is preferably beryllia. Beryllia has a high thermal conductivity, along with low electrical conductivity, high melting point, and good neutron moderating characteristics, rendering it a preferred ceramic for use as a moderator material for high temperature use in nuclear reactors and the like. However, the observed radiation damage characteristically suffered by beryllia during such use has heretofore been a serious problem. This problem has been overcome by the present invention. The present invention also extends to other refractory oxides such as alumina, magnesia, zirconia, titania and the like, alone or in mixture with beryllia and/or with each other.

The silicate glass-forming sintering agent may comprise one or a mixture of suitable constituents in finely divided form, that is, of particle size substantially smaller than the particle size utilized for the refractory oxide of the mixture. Bentonite is a preferred species of the silicate glass-forming agent for several reasons hereinafter set forth. Bentonite comprises a class of materials which are hydrated aluminum silicates, that is, montmorillonite-base colloidal clays. Each of the montmorillonite-base colloidal clays suitable for use in accordance with the present invention has a silica or silicate constituent capable under sintering temperature of providing a silicate glassy phase, as hereafter more particularly described. The material used must also be suitable as a sintering and bonding agent for the refractory oxide particles.

It is preferred to use bentonite in the present method since bentonite can be commercially obtained in very finely divided form, and since it is a suitable sintering and bonding agent. Of course, it yields a silicate glass phase during sintering. The bentonite or equivalent agent must be of sufficiently small particle size to fill the intergranular spaces between the refractory oxide particles and preferably also coat the surfaces of the refractory oxide particles. It will be understood that the silicate glass-forming agent can be selected for particle size according to the particle size of the refractory oxide.

It is within the scope of the present invention to utilize in place of bentonite in the indicated mixture such other suitable agents (providing the silicate glass-forming and sintering properties) as talc. Talc is a natural hydrated magnesium silicate. It may be mixed with calcium carbonate, calcium silicate, or other calcium-yielding material, if desired, so that under sintering conditions the silicate glass formed is preferably of the magnesium calcium silicate type. Other suitable silicate glass-forming agents can be selected for use which meet the described conditions.

The talc or talc-calcium carbonate mixture is usually utilized as the silicate glass-forming sintering agent where the refractory oxide is in relatively coarse or large particle size, for example, larger than 10 microns. Where relatively small particles of refractory oxide are used, bentonite is preferred. Thus, for example, bentonite that is available commercially in agglomerate sizes of 200 and 325 mesh may be dispersed with water to give particles smaller than 5 microns. Such small particle sizes are especially suitable for use with refractory oxides of particle size smaller than 10 microns or coarser particles.

The selection of the particle size is primarily on the basis of the desired particle size of the refractory oxide, considerations such as minimizing of recoil damage, suitable sizes for pressing and sintering efficiency etc. dictating the refractory oxide particle size. The particular silicate glass-forming sintering agent is then selected. Such agent is present in the mixture with the refractory oxide in a concentration sufficient to provide the desired improvement in radiation damage resistance.

It has been found that for most purposes, a concentration of from about 1 to 3%, by weight of the ceramic product, of the silicate glass-forming sintering agent is sufficient to produce a distinct improvement in radiation damage resistance in the ceramic product and also sufficient for sintering and bonding purposes. However, it will be understood that somewhat smaller concentrations of such agent can be utilized, as well as larger concentrations than the indicated range, depending upon the particular agent, the particular refractory oxide, respective particle sizes, etc.

With larger concentrations of the silicate glass-forming sintering agent the ultimate use of the product should be taken into consideration. In this regard, where the product is to be used as a moderator, and it is desired to have high structural strength, good thermal conductivity and other properties, including high neutron moderation, it may be desirable to limit the concentration of the agent to a concentration somewhere around the indicated 1 to 3%, by weight, concentration in order not to significantly depreciate the overall neutron-moderating efficiency of the refractory oxide component in the ceramic product.

The mixing operation can be carried out in any suitable manner. In order to facilitate adequate mixing of the refractory oxide with the sintering agent, and in order to facilitate the pressing operation, ordinarily an organic binding agent, such as, for example, methyl cellulose, ethyl cellulose, polyvinyl alcohol, paraffin, micro-crystalline wax or the like is employed in small concentration in the mix, for example from about 0.2 to about 1%, by weight, of the mix.

It is desirable in order to assure adequate mixing to slurry the refractory oxide and silicate glass-forming sintering agent in water, which may also contain in dispersion or solution a solvent for the binder. The slurry can then be mixed thoroughly, as in a ball mill or the like, the subsequent evaporation of the water and solvent being effected to form a paste of the mix. The paste can then be granulated to desired size, and then subjected to cold pressing to desired shape. Accordingly, the mixing operation per se is followed by particulating of the mix and then cold pressing of the resultant particle.

The particulating or granulating step can be conveniently carried out by forcing the paste, resulting from evaporation or filtering off of the water and binder solvent or carrier from the slurry, through a suitably sized mixing screen.

The cold pressing operation can take place in a steel mold or the like at a suitable elevated pressure for example, 5,000 to 10,000 p.s.i. ram pressure. The pressed compact is then thoroughly dried, and is sintered.

The sintering operation can be carried out by heating the pressed compact in air or inert gas or a vacuum to a sintering temperature for a suitable period of time, for example, two to four hours. The sintering temperature will vary, depending upon the silicate glass-forming agent or agents utilized. In most instances, the desired glassy phase can be formed at a sintering temperature somewhere around 1500° C. During the heating process it is important to avoid thermal stressing of the pressed compact. Accordingly, the compact is slowly heated and after the sintering operation is slowly cooled, for example, at heating and cooling rates of about 200° C. per hour.

In accordance with the method of the present invention, it is possible to provide finished ceramic products which have bulk densities roughly equivalent to the theoretical bulk density of solid crystal structure of the refractory oxide. Thus, bulk densities in the range of 90–95% of the theoretical density of beryllia have been obtained by the described cold pressing and sintering operations.

The exact mechanism whereby the improvements in radiation damage resistance are obtained in the ceramic products prepared in accordance with the method of the present invention is not definitely known. However, such improvements are reproducible and measurable. Although the present invention is not limited to the following theory, it is believed that the observed improvements in radiation damage resistance may be due to one or more of the following mechanisms. In the case of beryllia and other refractory oxides which during neutron irradiation at elevated temperatures exhibit helium generation, the helium so generated has a tendency to cause expansion of and structural defects in the ceramic bodies over extended periods of time. Thus, the helium is trapped within the ceramic and during formation and expansion tends to produce cracks, etc., in the ceramic. However, when a glassy phase formed of silicate is present on an inter-granular level in the ceramic, that is, between the particles forming the beryllia or other helium-generating ceramic, such glassy phase provides inter-granular pathways for ready diffusion of the helium so generated out of the ceramic product without material reduction in structural strength thereof.

Furthermore, it is believed that both with beryllia and refractory oxides such as alumina, zirconia and the like, the observed significant dimensional expansion normally occurring during high temperature neutron irradiation thereof is believed to occur as anisotropic crystal expansion which is further believed to be partly responsible for further reductions in structural strength of the ceramic product. It is believed that the silicate glass phase between the granules or particles of the ceramic acts as a cushion against the effects of such anisotropic crystal expansion, tending to minimize such effects by distributing the local strains and thus limit their extension from crystal to crystal throughout the ceramic product.

At any rate, the net result, whether beryllia or other refractory metal oxide is utilized in the ceramic product, is an observed substantial increase in the resistance of the ceramic product to depreciation of structural strength at elevated temperatures, for example, 1,000–2,000° C., during exposure thereof to neutron irradiation, such as, high intensity irradiation of the order of about $1-2 \times 10^{21}$ NVT (more than 1 mev.). Increases in dimensions of the ceramic and decreases in density are minimized.

The following examples further illustrate certain aspects of the present invention.

EXAMPLE I

A batch of ceramic material for the product of radiation-resistant ceramic moderator was prepared from the constituents specified in the following table:

Table I

| Constituents | Parts by Weight | Particle Size, Mesh |
|---|---|---|
| Beryllia, sinterable powder (calcined) | 98–99 | 10–50 |
| Bentonite | 2–1 | 200–325 |
| Water | 400 | |
| Paraffin | 0.5 | |
| Perchlorethylene | 5 | |

The bentonite specified in Table I had the approximate composition specified in Table II below.

Table II

Oxide constituents: Parts by weight, percent
$SiO_2$ ---- 44.07
$Al_2O_3$ ---- 10.12
$CaO$ ---- 13.42
$MgO$ ---- 13.04
$Na_2O, K_2O$ ---- 1.73

The beryllia and bentonite were initially mixed together in the indicated proportions (utilizing 400 g. of beryllia) in a ball mill half filled with alumina balls, and then the paraffin dissolved in the perchlorethylene was added. The concentration of water indicated in Table I was then added. The resulting slurry was mixed in the ball mill and then a thick paste was produced by gradual removal of water by filtration.

The resulting paste was then granulated by forcing it through a 16 mesh screen. The thus granulated material was compacted and shaped by pressing in a steel mold at ambient temperature and at a pressure 5,000 to 10,000 p.s.i. ram pressure. The formed compact was then thoroughly dried and sintered by heating in air at 1540° C. in an electrically heated furnace for 4 hours, with an increase in temperature, to the sintering temperature, of about 200° C. per hour. After sintering for four hours at the 1540° C. temperature, the product was cooled at the rate of about 200° C. per hour to ambient temperature. A bulk density of 95% of the beryllia crystal density of 3.01 grams per cc. was obtained by the indicated cold pressing and sintering procedure.

The product in pellet form was then irradiated at $1-2 \times 10^{21}$ NVT (more than 1 mev.) with the temperature above 1,000° C. for an extended period of time and the various characteristics of the irradiated pellets were compared against those of unirradiated pellets similarly produced.

It was found that the dimensions of the irradiated pellets increased less than an average of 1% while their density decreased less than an average of 3%. The axial crushing strengths of irradiated pellets decreased by a factor of 2–3, while the thermal diffusivities thereof were 15 to 40% lower than for unirradiated control pellets prepared in an identical manner. These characteristics for the irradiated pellets were substantially improved over beryllia pellets containing no bentonite or other silicate glass-forming sintering agent prepared by the same technique as specified above, and irradiated for the same length of time at the same temperature and neutron intensity.

EXAMPLE II

A batch of ceramic material having the following composition is prepared:

*Table III*

| Constituents | Parts by Weight | Particle Size, Mesh |
| --- | --- | --- |
| Alumina sinterable powder | 95 | 10 |
| Talc | 3 | 100 |
| Calcium carbonate | 2 | 100 |
| Water | 400 | |
| Methyl cellulose | 0.5 | |
| Trichlorethylene | 5 | |

The above composition is mixed together, granulated, cold pressed and sintered substantially as described in Example I except that the sintering temperature employed is about 1700° C. The product is subjected to approximately 1 mev. neutron irradiation at above 1,000° C. for an extended period of time and then inspected. It is found to be after irradiation, hard and dense and structurally strong and it exhibits less reduction in structural strength and in density and less dimensional change than a comparable product prepared according to the same technique but without the addition of the talc and calcium carbonate or other silicate glass-forming sintering agent, and subjected to identical high intensity neutron irradiation at the same temperature for the same period of time.

The foregoing examples clearly illustrate the advantages of the present method and the improved characteristics of the ceramic products provided in accordance with the method. The ceramic products are hard, dense, structurally strong and exhibit improved resistance to neutron irradiation at elevated temperatures over extended periods of time. In this regard, during such irradiation the dimensions of the products change only to a small extent, as do the densities, structural strength and thermal diffusivities thereof. Accordingly, the products are improved for high temperature use in high intensity neutron radiation environments. The products are also capable of being utilized for other high temperature purposes. Other advantages of the present invention are as set forth in the foregoing.

Various of the features of the invention are set forth in the appended claims.

What is claimed is:

1. A method of preparing improved ceramic products of enhanced resistance to structural damage upon neutron irradiation, which method comprises the steps of mixing together particulate beryllia and bentonite having a substantially smaller average particle size than that of said beryllia, pressing said mixture and sintering said mixture at above the sintering temperature of said bentonite, whereby an improved sintered beryllia product containing sintered bentonite on an inter-particle level is provided.

2. A method of preparing an improved ceramic product of enhanced resistance to structural damage upon neutron irradiation, which method comprises the steps of intimately mixing together particulate beryllia and bentonite having a substantially smaller particle size than that of said beryllia, particulating said mixture, cold pressing the resultant particles to a compact and sintering said compact at above the sintering temperature of said bentonite, whereby an improved sintered beryllia product containing sintered bentonite on an inter-particle level is provided.

3. A method of preparing an improved ceramic product of enhanced resistance to structural damage upon neutron irradiation, which method comprises the steps of intimately mixing together particulate beryllia having particle size substantially within the range from 10 to 50 mesh and bentonite having a particle size substantially within the range from 200 to 325 mesh, said bentonite being present in a concentration sufficient to act as a sintering aid, slurrying said mixture with water and an organic binding agent, forming a paste therefrom, particulating said paste, cold pressing the resultant particles to a compact, drying said compact and sintering said compact at above the sintering temperature of said bentonite, whereby an improved sintered beryllia product containing sintered bentonite on an inter-particle level is provided.

4. A method of preparing an improved beryllia compact of enhanced resistance to structural damage upon neutron irradiation, which method comprises the steps of mixing together particulate beryllia and bentonite having a sufficiently smaller particle size than that of said beryllia to fill the spaces between said beryllia particles, said bentonite being present in a concentration sufficient to act as a sintering aid, particulating said mixture, pressing the resultant particles into a compact and sintering said compact at above the sintering temperature of said bentonite, whereby an improved sintered beryllia compact containing sintered bentonite on an interparticle level is provided.

5. A method of preparing an improved beryllia compact of enhanced resistance to structural damage upon neutron irradiation, which method comprises the steps of intimately mixing together particulate beryllia having particle size substantially within the range from 10 to 50 mesh and bentonite having a particle size substantially within the range from 200 to 325 mesh, said bentonite being present in a concentration sufficient to act as a sintering aid, slurrying said mixture with water and an organic binding agent and a solvent for said organic binding agent, forming a wet paste therefrom, particulating said paste, cold pressing the resultant particles to a compact, drying said compact and sintering said compact at a temperature approximately 1540° C., whereby an improved sintered beryllia compact containing sintered bentonite on an inter-particle level is provided.

6. The method of claim 1 wherein said bentonite is present in a concentration of between about 1 and about 3 percent, by weight, of the mixture of said bentonite and beryllia.

7. An improved ceramic product of enhanced resistance to structural damage upon neutron irradiation, which product comprises a sintered unitary mass of beryllia particles and bentonite having a particle size substantially smaller than that of said beryllia.

8. An improved ceramic product of enhanced resistance to structural damage upon neutron irradiation, which product is a sintered unitary mass comprising a major proportion of beryllia particles and a minor proportion of bentonite having a particle size substantially smaller than that of said beryllia disposed between said particles.

9. The improved ceramic product of claim 8 wherein said sintered bentonite comprises between about 1 and about 3 percent of the combined weight of said beryllia and said bentonite.

10. The method of claim 5 wherein said bentonite is present in a concentration of substantially within the range of 1 to 3 percent, by weight, of the mixture of said bentonite and beryllia.

11. The improved ceramic product of claim 8 wherein said beryllia has a particle size substantially within the range from 10 to 50 mesh, and wherein said bentonite has a particle size substantially within the range from 200 to 325 mesh.

12. The improved ceramic product of claim 9 wherein said beryllia has a particle size substantially within the range from 10 to 50 mesh, and wherein said bentonite has a particle size substantially within the range from 200 to 325 mesh.

References Cited in the file of this patent

UNITED STATES PATENTS

| | | |
|---|---|---|
| 2,018,600 | Brown | Oct. 22, 1935 |
| 2,747,105 | Fitzgerald et al. | May 22, 1956 |
| 2,818,605 | Miller | Jan. 7, 1958 |
| 3,007,882 | Lach | Nov. 7, 1961 |

FOREIGN PATENTS

| | | |
|---|---|---|
| 884,577 | Great Britain | Dec. 13, 1961 |